US012665353B2

(12) United States Patent
Stamm et al.

(10) Patent No.: US 12,665,353 B2
(45) Date of Patent: Jun. 23, 2026

(54) PLUG-IN CONNECTOR FOR SYMMETRICAL SIGNAL TRANSMISSION

(71) Applicant: Phoenix Contact GmbH & Co. KG, Blomberg (DE)

(72) Inventors: Sebastian Stamm, Brakel (DE); Thomas Kaps, Vlotho (DE); Karsten Krome, Detmold (DE)

(73) Assignee: PHOENIX CONTACT GMBH & CO. KG, Blomberg (DE)

(*) Notice: Subject to any disclaimer, the term of this patent is extended or adjusted under 35 U.S.C. 154(b) by 775 days.

(21) Appl. No.: 17/924,385

(22) PCT Filed: May 5, 2021

(86) PCT No.: PCT/EP2021/061856
§ 371 (c)(1),
(2) Date: Nov. 10, 2022

(87) PCT Pub. No.: WO2021/228655
PCT Pub. Date: Nov. 18, 2021

(65) Prior Publication Data

US 2023/0144535 A1 May 11, 2023

(30) Foreign Application Priority Data

May 12, 2020 (BE) .................................. 2020/5324

(51) Int. Cl.

| | |
|---|---|
| ***H01R 13/6476*** | (2011.01) |
| ***H01R 13/506*** | (2006.01) |
| ***H01R 31/06*** | (2006.01) |
| *H01R 13/64* | (2006.01) |
| *H01R 103/00* | (2006.01) |

(52) U.S. Cl.
CPC ....... *H01R 13/6476* (2013.01); *H01R 13/506* (2013.01); *H01R 31/06* (2013.01); *H01R 13/64* (2013.01); *H01R 2103/00* (2013.01)

(58) Field of Classification Search
CPC .. H01R 13/6476; H01R 13/506; H01R 31/06; H01R 13/64; H01R 2103/00
See application file for complete search history.

(56) References Cited

U.S. PATENT DOCUMENTS

| | | | | |
|---|---|---|---|---|
| 9,070,998 | B2 * | 6/2015 | Phillips | H01R 13/6474 |
| 10,404,014 | B2 | 9/2019 | Huang | |

(Continued)

FOREIGN PATENT DOCUMENTS

| | | | |
|---|---|---|---|
| DE | 112018003543 T5 | 4/2020 | |
| JP | 2006500749 A | 1/2006 | |

(Continued)

*Primary Examiner* — Abdullah A Riyami
(74) *Attorney, Agent, or Firm* — LEYDIG, VOIT & MAYER, LTD.

(57) ABSTRACT

A plug connector for symmetrical signal transmission includes: at least two connection contacts on a connection side of the plug connector; at least two plug contacts on a plugging side of the plug connector on an opposite side to the connection side; at least two conductors, each of which connects one connection contact to one of the plug contacts in an electrically conductive manner; and a dielectric enclosure of the at least two conductors, the dielectric enclosure having at least one clearance between the conductors.

20 Claims, 7 Drawing Sheets

(56) References Cited

U.S. PATENT DOCUMENTS

| | | | |
|---|---|---|---|
| 10,522,938 | B1 | 12/2019 | Walton et al. |
| 2004/0121633 | A1 | 6/2004 | David et al. |
| 2007/0099486 | A1 | 5/2007 | Kameyama |
| 2014/0030905 | A1 | 1/2014 | Phillips et al. |
| 2017/0040747 | A1 | 2/2017 | Hayashi |
| 2018/0241156 | A1 | 8/2018 | Huang et al. |
| 2020/0227863 | A1 | 7/2020 | Maesoba et al. |

FOREIGN PATENT DOCUMENTS

| | | | |
|---|---|---|---|
| JP | 2007123025 | A | 5/2007 |
| JP | 2014060144 | A | 4/2014 |
| WO | WO 2004030158 | A2 | 5/2007 |

* cited by examiner

PLUG-IN CONNECTOR FOR SYMMETRICAL SIGNAL TRANSMISSION

CROSS-REFERENCE TO PRIOR APPLICATIONS

This application is a U.S. National Phase application under 35 U.S.C. § 371 of International Application No. PCT/EP2021/061856, filed on May 5, 2021, and claims benefit to Belgian Patent Application No. BE 2020/5324, filed on May 12, 2020. The International Application was published in German on Nov. 18, 2021 as WO/2021/228655 under PCT Article 21(2).

FIELD

The invention relates to a plug connector for symmetrical signal transmission. In particular, a plug connector for differential data transmission is provided, without being limited thereto.

BACKGROUND

In wire-bound, symmetrical data transmission, for example differential data transmission, the characteristic impedance is a crucial parameter of the transmission path for maintaining the signal integrity and should be as uniform as possible at each point for the entire transmission path. In this context, the characteristic impedance, or more specifically the differential characteristic impedance, denotes the location-based characteristic impedance along the transmission path. By way of example, it may correspond to the input impedance of a hypothetical line of infinite length, the uniform cross-section of which is constructed in the same way as the cross-section of the relevant point under observation. The characteristic impedance may also be referred to as the surge impedance or just as the impedance.

Divergences from the uniform value of the characteristic impedance lead to reflection attenuation (also referred to as return loss attenuation or RL), which adversely affects the signal integrity. The characteristic impedance is predominantly affected by the geometric arrangement of the conductors and by the electromagnetic properties of the material surrounding the conductors. For example, in the high-frequency range the characteristic impedance Z may be determined by the local inductance coating L' and the local capacitance coating C' at the relevant point under observation, as follows:

$$Z = \sqrt{\frac{L'}{C'}}$$

Document U.S. Ser. No. 10/404,014 B2 discloses orifices between contacts of a plug connector with a view to influencing crosstalk between the contacts. However, the drawback thereof is that the contacts cannot be free-standing but rather have to at least partly adjoin a dielectric environment having the orifices. As a result, the possible geometries of the contacts and the mechanical connection systems that can be implemented are very limited.

In addition, according to cited document U.S. Ser. No. 10/404,014 B2, the orifices reduce crosstalk. However, reflection attenuation may adversely affect the signal integrity if no impedance adjustment is carried out on the plug connector.

SUMMARY

In an embodiment, the present invention provides a plug connector for symmetrical signal transmission, comprising: at least two connection contacts on a connection side of the plug connector; at least two plug contacts on a plugging side of the plug connector on an opposite side to the connection side; at least two conductors, each of which is configured to connect one connection contact to one of the plug contacts in an electrically conductive manner; and a dielectric enclosure of the at least two conductors, the dielectric enclosure having at least one clearance between the conductors.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
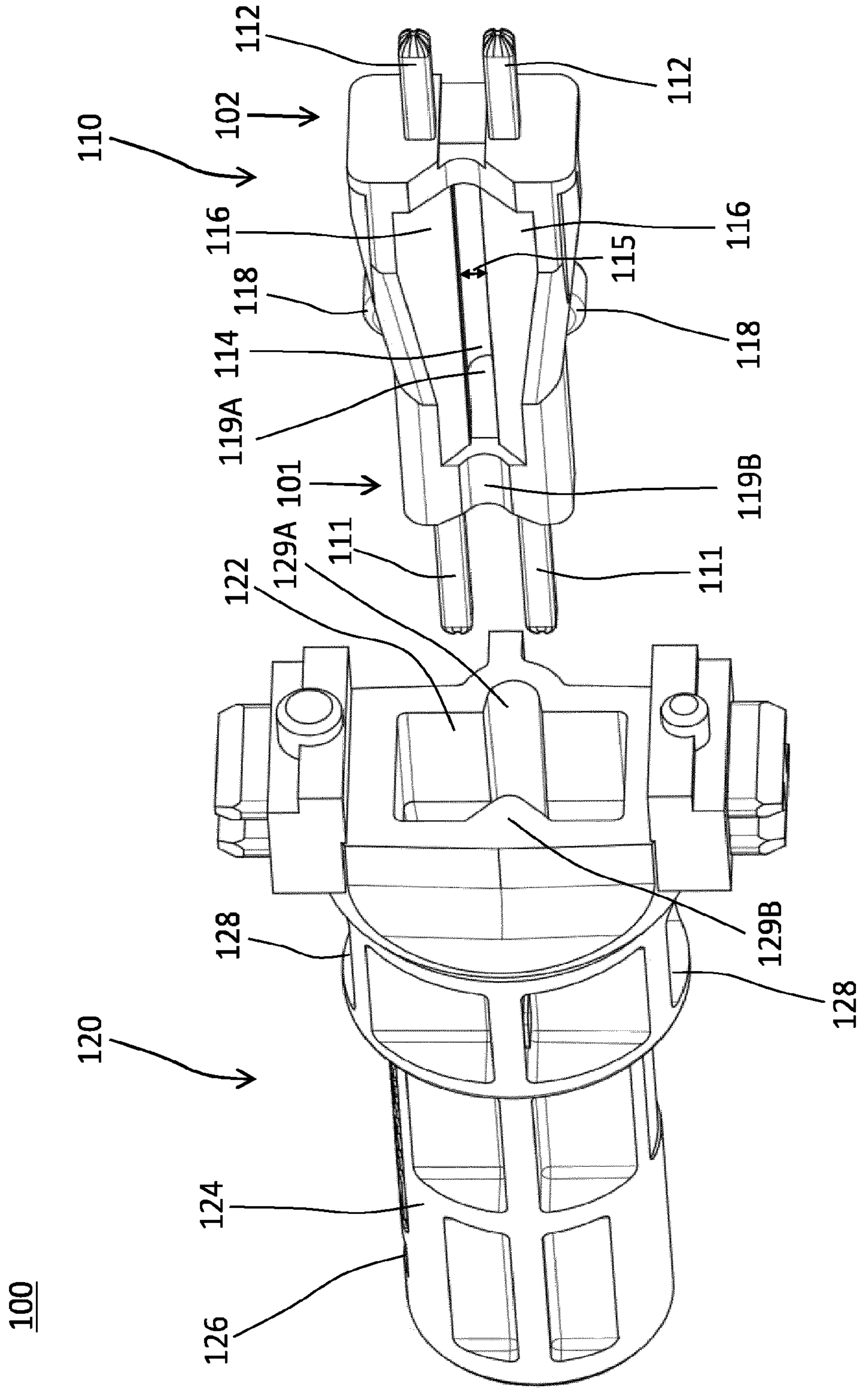
FIG. 1 is a perspective view of a plug connector according to a first embodiment example in an open state.

In an embodiment, the present invention provides a plug connector of which the characteristic impedance can be adjusted, preferably increased, by structural measures without increasing the installation space required for the plug connector. An embodiment makes resilient latching of the plug connector possible without impairing a characteristic-impedance adjustment or creating greater installation space requirements for the plug connector.

Embodiment examples of the invention are described below, in part with reference to the drawings.

According to one aspect, a plug connector for symmetrical, preferably differential, signal transmission comprises at least two connection contacts on a connection side of the plug connector. The plug connector further comprises at least two plug contacts on a plugging side of the plug connector on the opposite side to the connection side, and at least two conductors which each connect one connection contact to one of the plug contacts in an electrically conductive manner. Furthermore, the plug connector comprises a dielectric enclosure of the at least two conductors. The dielectric enclosure has at least one clearance between the conductors.

By means of the at least one clearance in the dielectric enclosure of the at least two conductors between the connection side and the plugging side, embodiment examples of the plug connector can adjust the dielectric environment of the conductors, for example in order to adapt a characteristic impedance (preferably a line characteristic impedance) of the plug connector, without having to adjust the enclosure or the geometry of the connection contacts and/or plug contacts of the plug connector.

By way of example, the connection contacts and/or the plug contacts may be free-standing, preferably protruding out on the connection side or plugging side, respectively. There is no need to modify the environment of the plug contacts as disclosed, for example, in document U.S. Ser. No. 10/404,014 B2.

By means of the clearance, embodiment examples of the plug connector can have a characteristic impedance that is adjusted by structural measures. For example, by making the clearance larger (preferably lengthening the clearance along the at least two conductors), the characteristic impedance of the plug connector can be increased without making the structural shape of the plug connector any larger. Alternatively or additionally, the dielectric enclosure of the plug connector may have a lower effective permittivity than the permittivity of the material used for the enclosure or than the permittivity of a conventional plastics insulation material.

One dielectric-enclosure portion delimiting the clearance, for example an edge of the clearance, may be resilient. The portion may be resilient owing to the clearance being deformable. The portion may be referred to as a spring element.

An embodiment example of the plug connector may be constructed from multiple parts. The individual components may be latchable together (for example during assembly) by means of the spring element.

In principle, each plug connector in a transmission path constitutes a local disturbance for the characteristic impedance. By means of the clearance, embodiment examples of the plug connector can keep a divergence of the characteristic impedance of the plug connector as low as possible compared with the characteristic impedance of either a cable connected on the connection side (i.e., connected to the connection contacts in an electrically conductive manner) or a terminal on a printed circuit board. By way of example, the plug connector may be a socket that is or can be assembled on the printed circuit board. The printed circuit board may be connected or connectable to the connection contacts.

In plug connectors, there are often structural restrictions in terms of installation space and/or a high-voltage endurance to be adhered to. The at least one clearance makes it possible to provide a measure for influencing the characteristic impedance of the plug connector that also retains or adheres to the installation space requirements.

Owing to the at least one clearance in the dielectric enclosure between the conductors, it is possible to use a dielectric-enclosure material of which the relative permittivity $\varepsilon_r$ is conventionally too high or which would lead to too low a characteristic impedance. For example, conventionally used plastics materials having a relative permittivity $\varepsilon_r$ of between 2 and 8 may be used for the dielectric enclosure. Materials having values of $\varepsilon_r$ of less than 2 are often foamed materials, which often do not have adequate strength, long-term durability, and/or insulation resistance to function as a dielectric enclosure of the conductors (i.e., as a support for the plug and/or connection contacts; contact supports in short).

Owing to the at least one clearance (for example an opening and/or a cavity) in the material of the dielectric enclosure, embodiment examples may compensate for a characteristic-impedance disturbance produced by a conventional plug connector, without restricting the environment or geometry of the plug and/or connection contacts. Alternatively or additionally, the at least one clearance between the conductors and between the plugging side and the connection side may make use of the installation space for a mechanical function, for example for the resilient deformation during assembly of the plug connector.

A recess or through-opening in the dielectric enclosure may encompass the clearance. The recess or through-opening may extend (in some portions, for example) between the at least two conductors. Alternatively or additionally, the clearance may be a recess or through-opening in the dielectric enclosure. Alternatively or additionally, the clearance may be in fluid communication with an environment of the plug connector.

The clearance may be a gas-tight cavity. The cavity may be filled with air or a noble gas or be evacuated, for example at a residual pressure of less than 30,000 Pa. By filling the cavity with gas and/or owing to the residual pressure, the effective relative permittivity of the dielectric enclosure, and thus the characteristic impedance of the plug connector, can be determinable by structural measures.

The dielectric enclosure may be integral in one piece. Alternatively or additionally, the dielectric enclosure may be an injection-molded part.

The dielectric enclosure may extend from the connection side to the plugging side. The connection side and the plugging side may each be end faces of the dielectric enclosure, the connection contacts and plug contacts preferably protruding therefrom, respectively.

The dielectric enclosure may surround each of the at least two conductors. By way of example, the dielectric enclosure may surround each of the at least two conductors in each case at least at one point between the connection side and the plugging side or continuously between the connection side and the plugging side. Surrounding each conductor may involve each conductor being enclosed in a closed manner all around.

The dielectric enclosure may be produced by encapsulating the at least two conductors. Alternatively or additionally, the dielectric enclosure may insulate the at least two conductors (preferably continuously) between the connection side and the plugging side.

The dielectric enclosure may surround each of the at least two conductors, one being on the plugging side and one on the connection side. The dielectric enclosure may be made of a material that has a relative permittivity of at least 1.5 or 2 and/or of at most 8.

The dielectric enclosure between the conductors in a cross-section transverse to a longitudinal direction of the conductors owing to the clearance may have an effective relative permittivity of less than 1.5 or 2. The effective relative permittivity, $$\varepsilon_r^{(eff)},$$

can correspond to or be determined by $$\varepsilon_r^{(eff)} = \frac{d}{\sum_j \frac{d_j}{\varepsilon_r^{(j)}}},$$

where $d=\Sigma_j d_j$ is the distance between the conductors in cross-section and $$\varepsilon_r^{(j)}$$

is the relative permittivity in the related portion of the width $d_j$ of the cross-section. The relative permittivity of the clearance may be $$\varepsilon_r^{(j')} = \varepsilon_r^{(Air)} \text{ or } \varepsilon_r^{(j')} = 1, \text{ i.e.,}$$

in the portion of the cross-dimension, $d_j$, of the clearance.

The dielectric enclosure may be resilient in a first transverse direction transverse to a longitudinal direction of the at least two conductors, with the clearance deforming (for example with the cross-dimension of the clearance decreasing) and/or with the at least two conductors, or one of the at least two conductors, bending.

The plug connector may further comprise a housing part. The housing part may have an inner surface and at least one latching recess in the inner surface. In addition, the housing part may have a receiving opening that opens toward the inner surface. The receiving opening may be configured to receive the dielectric enclosure in the longitudinal direction. The dielectric enclosure may have a latch element (for example in the form of the spring element). The latch element may be arranged so as to slide over the inner surface (for example with the clearance contracting in the first transverse direction) when the dielectric enclosure is received in the housing part, and to reach into the latching recess (for example with the clearance widening in the first transverse direction) when the enclosure is in the received state in the housing part, preferably for reversibly locking the received state.

The clearance may widen toward the exterior of the dielectric enclosure in a second transverse direction that is transverse to the first transverse direction and transverse to the longitudinal direction. For example, the clearance may widen in relation to the first transverse direction and/or along chamfers. The chamfers may extend in the longitudinal direction.

Furthermore, the plug connector may comprise a cable connected on the connection side to the at least two connection contacts in an electrically conductive manner, or a printed circuit board connected on the connection side to the at least two connection contacts in an electrically conductive manner, or may be connectable to the cable or printed circuit board in an electrically conductive manner. The connection side may be electrically and/or mechanically connected or connectable to a terminal of the printed circuit board.

A cross-dimension of the clearance in the dielectric enclosure transverse to a longitudinal direction of the at least two conductors may influence a characteristic impedance of the plug connector. The plug connector characteristic impedance, which is or can be influenced by means of the clearance (for example by structural measures), may be adjusted to a characteristic impedance of the cable or of the printed circuit board terminal.

The characteristic impedance of the plug connector may be inversely proportional to the square root of the effective relative permittivity, $$\varepsilon_r^{(eff)}.$$

FIG. 1 is a perspective view of a first embodiment example of a plug connector (denoted generally by reference numeral 100) for symmetrical, preferably differential, signal transmission. The plug connector 100 comprises at least two connection contacts 112 on a connection side 102 of the plug connector 100, and at least two plug contacts 111 on a plugging side 101 of the plug connector 100 on the opposite side to the connection side 102.

At least two conductors each connect one connection contact 112 to one of the plug contacts 111 in an electrically conductive manner (preferably in a one-to-one assignment). The plug connector 100 further comprises a dielectric enclosure 110 of the at least two conductors. The dielectric enclosure 110 may be integrally bonded to or interlocked with the at least two conductors and/or may electrically insulate the at least two conductors. The dielectric enclosure 110 has at least one clearance 114 in a space between the at least two conductors. The clearance 114 may be a cavity or a through-hole in the dielectric enclosure.

The dielectric enclosure 110 may also be referred to as a contact support. The dielectric enclosure 110 is preferably molded integrally in one piece from a dielectric material, for example a plastics material.

The plug contacts 111, conductors, and connection contacts 112, which are each interconnected in an electrically conductive manner, may each be a continuous metal pin.

The first embodiment example of the plug connector 100 comprises a plurality of components, specifically the enclosure 110 and a housing part 120. In the state shown in FIG. 1, the components 110 and 120 of the plug connector 100 are in an open or disassembled state.

The housing part 120 has a receiving opening 122 for receiving the dielectric enclosure 110. To ensure the polarity (i.e., to avoid false polarity), the enclosure 110 has polarity encodings 119A and 119B, which are not symmetrical with respect to a 180° rotation of the enclosure around the longitudinal direction. The receiving opening 122 opens into an inner surface of the housing part 120, said inner surface having polarity encodings 129A and 129B, which are formed so as to complement the polarity encodings 119A and 119B of the enclosure 110.

On the side of the clearance 114, the enclosure 110 has latch elements 118, for example detent cams. When the enclosure 110 is received in the housing part 120 (for example during assembly of the plug connector 110), the latch elements 118 are compressed in the first transverse direction (for example in the vertical direction in FIG. 1) and slide along the inner surface of the housing part 120 until the latch elements 118 engage in latching recesses 128 in the inner surface of the housing part 120. The clearance 114 enables the resilience of the latch elements 118 owing to contraction of the cross-dimension 115 of the clearance 114 in the first transverse direction.

In addition to the clearance 114, mechanical and/or electromagnetic (in particular dielectric) properties of the plug contact 100 can be adjusted by structural measures by means of optional chamfers 116 on the clearance 114. For example, a spring constant of the compressible latch elements 118 and/or the characteristic impedance of the plug contact 110 may be determinable independently of one another.

By adjusting the characteristic impedance of the plug connector to the characteristic impedance of a cable connected on the connection side 102 or of a printed circuit board connected on the connection side 102, a reflection factor can be minimized. If an electromagnetic wave of any shape propagates along the cable (or through the printed circuit board terminal and/or along conducting tracks of the printed circuit board) and along the conductors of the plug connector 100, a reflection occurs if the characteristic impedance (also referred to as the surge impedance) changes at the connection point 102. Where the behavior is linear (for example where a dielectric function of the enclosure 110 is linear), a dimensionless reflection factor describes how the reflected voltage and current wave is generated from the incoming wave. Owing to a real-valued reflection factor, the reflection attenuation corresponding to the square of the reflection factor may occur even if the signal transmission is distortion-free or loss-free. The real-valued reflection factor is zero when the characteristic impedances of the cable and plug connector 100 match.

Optionally, the housing part 120 has a mechanical cable fastener, for example a strain relief assembly of the cable, and/or a covering 124 of the free-standing plug contacts 111. The covering 124 may be used to mechanically connect the plug connector 100 to a complementary plug connector, which may be another embodiment example of the plug connector 100. For example, the complementary plug connectors 100 may be mechanically connectable by means of a bayonet closure on the covering 124.

Alternatively or additionally, the housing part 120 has a latching window 126 in the covering 124. In one embodiment example, the entire plug connector 100 (i.e., the plug connector 100 having the dielectric enclosure 110 received therein, for example in the form of a plug) is soldered to the connection contacts 112 in a printed circuit board. On the plugging side 101, a complementary plug connector (preferably a free-standing plug connector connected to a cable end, for example a coupling) is inserted into the covering 124 of the plug connector 100. A catch of the complementary plug connector reaches into the latching window 126.

Whereas the plug connector 100 in the first embodiment example is configured as a plug, a variant of each embodiment example may also be configured as a socket.

Figure 2:
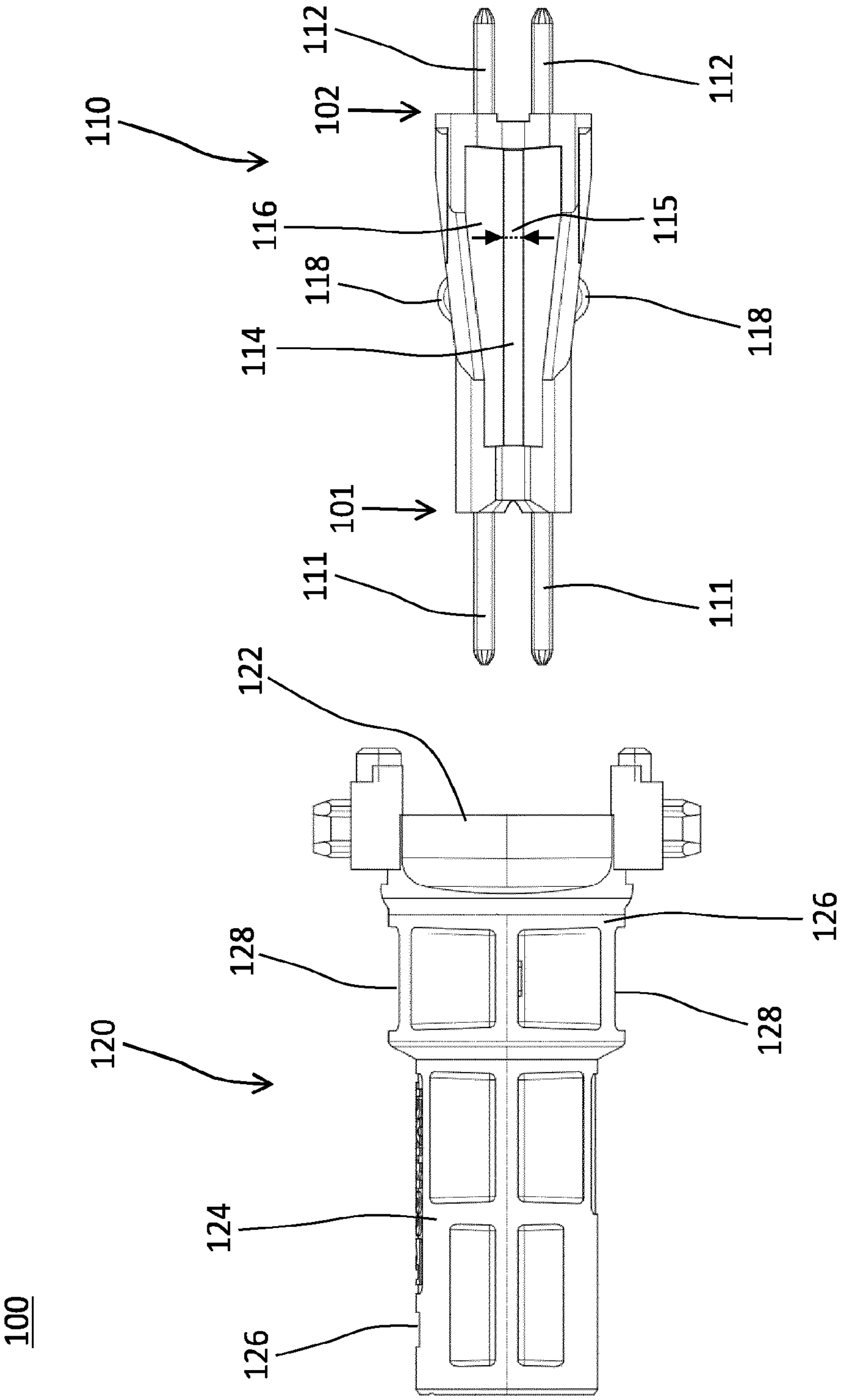
FIG. 2 is a side view of the plug connector according to the first embodiment example in the open state.

FIG. 2 is a side view of the plug connector 100 according to the first embodiment example in the open (i.e., disassembled) state. Reference numerals that match those of FIG. 1 denote matching or interchangeable features.

Figure 3:
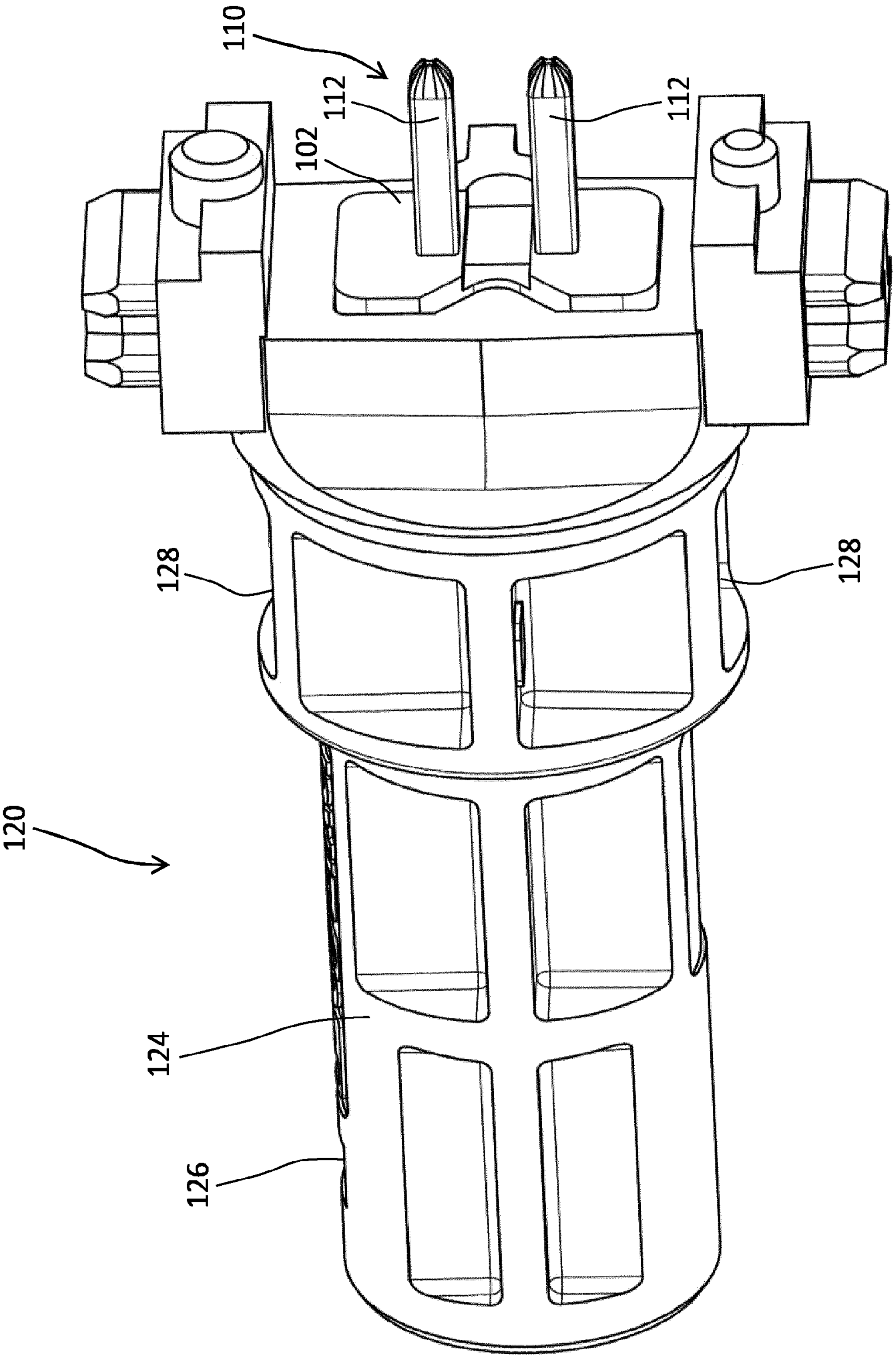
FIG. 3 is a perspective view of the plug connector according to the first embodiment example in an assembled state.

FIG. 3 is a perspective view of the plug connector 100 according to the first embodiment example in an assembled state. Reference numerals that match those of FIG. 1 or FIG. 2 denote matching or interchangeable features.

Figure 4A:
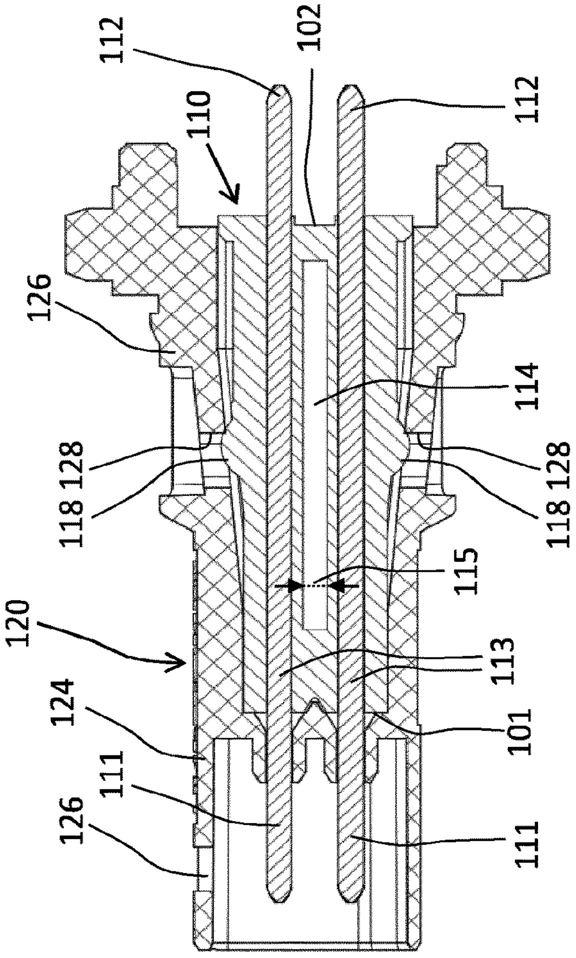
FIG. 4A is a sectional view of the plug connector according to the first embodiment example in the assembled state.

FIG. 4A is a sectional view of the plug connector 100 according to the first embodiment example in the assembled state. The at least two conductors are denoted generally by reference numeral 113.

The clearance 114 may be cylindrical. The clearance 114 may extend in parallel with the longitudinal direction of the conductors 113. The clearance 114 may extend along a portion of the conductors 113. The free-standing plug contacts 111 and the connection contacts 112 are thus not affected, in particular in terms of their shape and/or environment, by the characteristic-impedance adjustment implemented by means of the clearance 114.

Figure 4B:
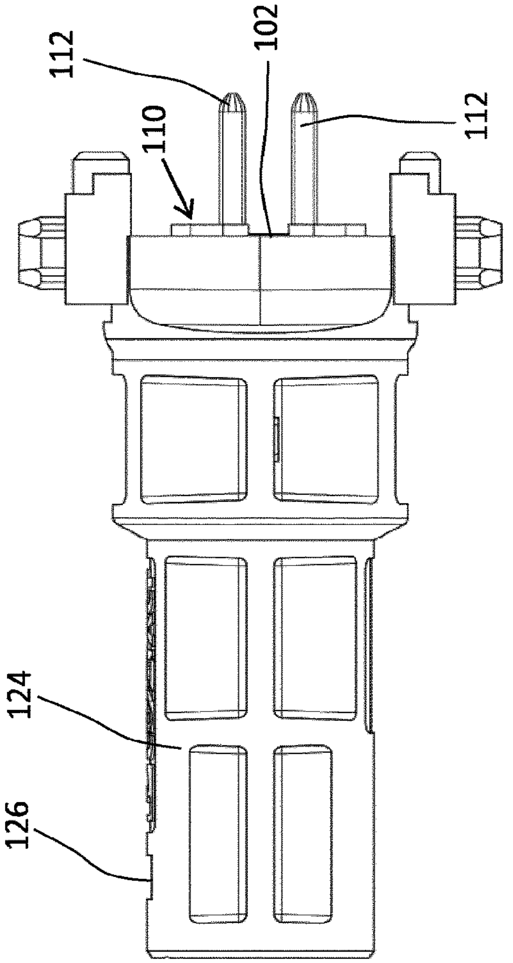
FIG. 4B is a side view of the plug connector according to the first embodiment example in the assembled state.

FIG. 4B is the side view of the plug connector 100 corresponding to the sectional view in FIG. 4A.

Figure 5A:
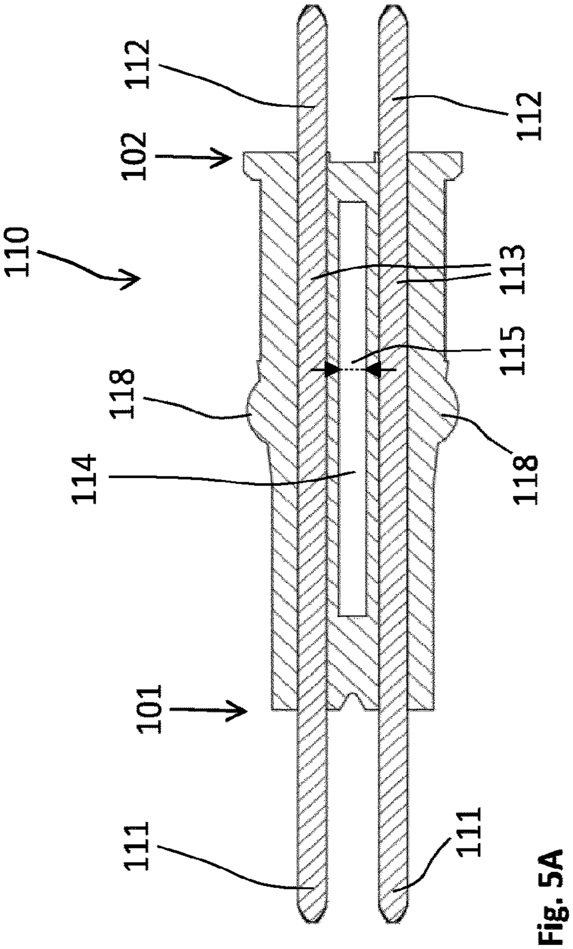
FIG. 5A is a longitudinal-sectional view of a dielectric enclosure that can be used in the first embodiment example of the plug connector.
Figure 5B:
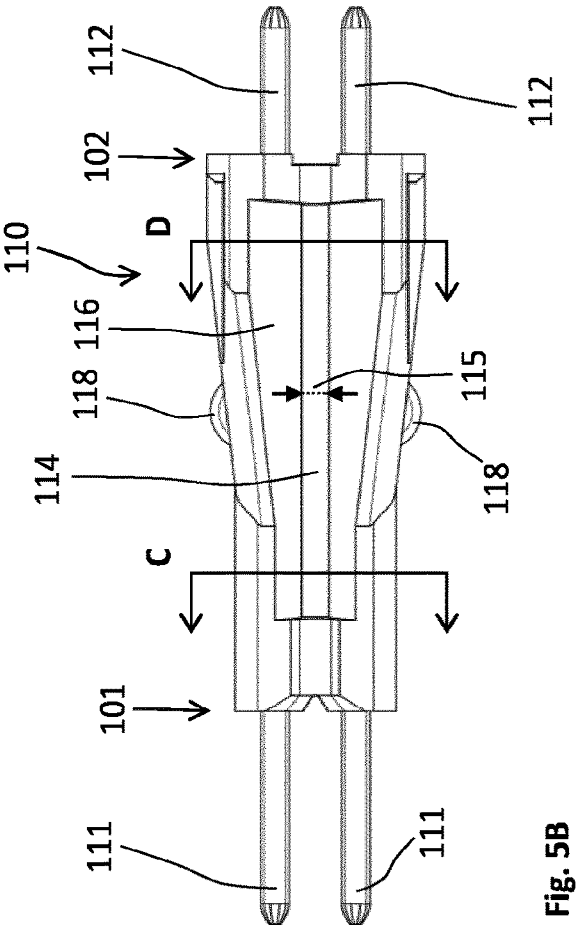
FIG. 5B is a side view of the dielectric enclosure that can be used in the first embodiment example of the plug connector.

FIG. 5A is a sectional view of a first embodiment example of the dielectric enclosure 110 that can be used in the first embodiment example of the plug connector 100. The sectional plane shown is parallel to the longitudinal direction (for example the horizontal direction in FIG. 5A) and in the plane of the conductors 113. In other words, the sectional plane shown in FIG. 5A encompasses the longitudinal direction and the first transverse direction. FIG. 5B is a corresponding side view of the dielectric enclosure 110 looking in the second transverse direction.

Figure 5D:
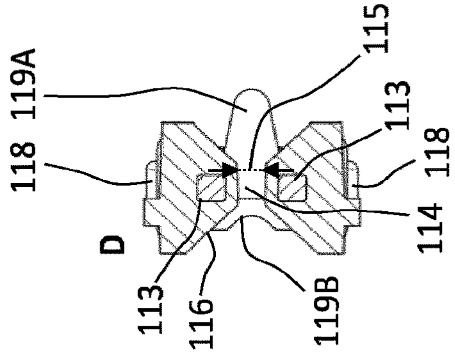
FIG. 5D is a sectional view of the dielectric enclosure that can be used in the first embodiment example of the plug connector, in a second cross-sectional plane.
Figure 5C:
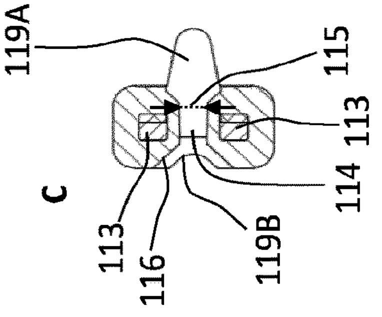
FIG. 5C is a sectional view of the dielectric enclosure that can be used in the first embodiment example of the plug connector, in a first cross-sectional plane.

FIG. 5C is a sectional view of the first embodiment example of the dielectric enclosure 110 in a first cross-sectional plane that encompasses the first transverse direction and the second transverse direction. FIG. 5D is a sectional view in a second cross-sectional plane that is parallel to the first cross-sectional plane and closer to the connection side 102.

Figures 6A, 6B, 6C, 6D, 6E, 6F, 6G, 6H, 6I:
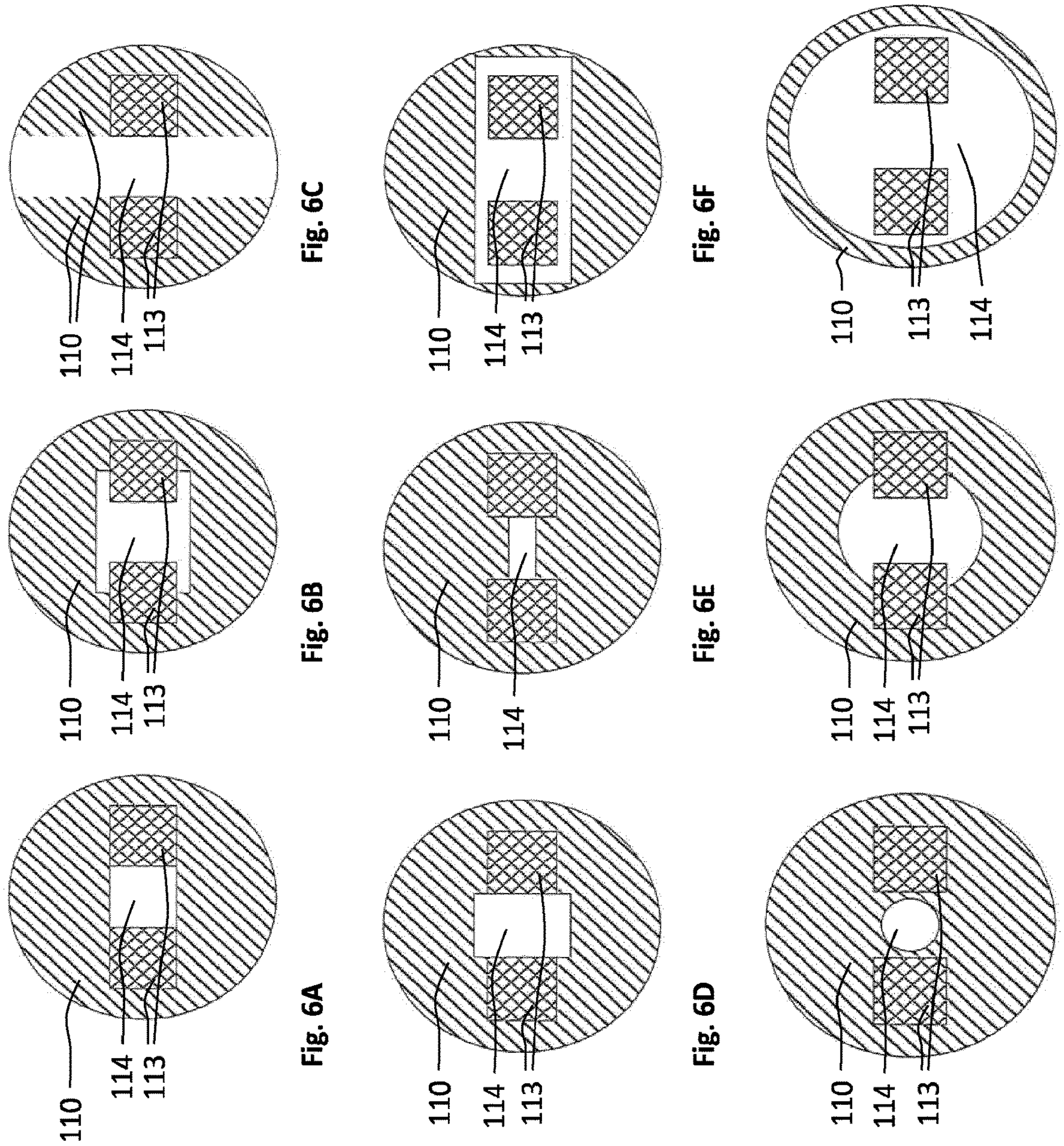
FIG. 6A to 6I are each schematic cross sections perpendicular to the longitudinal direction of further embodiment examples of the dielectric enclosure.

FIG. 6A to 61 are each schematic cross sections of further embodiment examples of the dielectric enclosure 110, each of which can be implemented as a variant or development of the first embodiment example. In FIG. 6A to 61, the first transverse direction is vertical and the second transverse direction is horizontal.

The clearance 114 may be cuboidal, as shown for example in FIG. 6A to 6F. Alternatively or additionally, the clearance 114 may terminate at the mutually facing sides of the conductors 113, as shown for example in FIGS. 6A, 6C, 6D, and 6E, preferably with the clearance 114 extending to different lengths in the second transverse direction.

Alternatively or additionally, the clearance 114 may be cylindrical, as shown for example in FIG. 6G to 61.

Figure 7A:
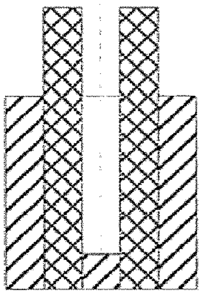
FIG. 7A to 7P are each schematic cross sections parallel to the longitudinal direction of further embodiment examples of the dielectric enclosure.
Figure 7B:
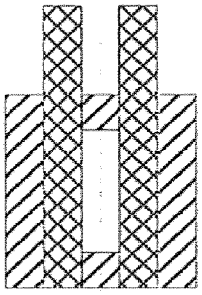
Figure 7C:
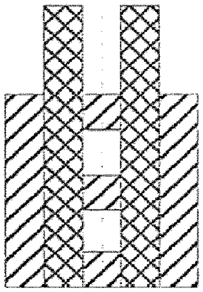
Figure 7D:
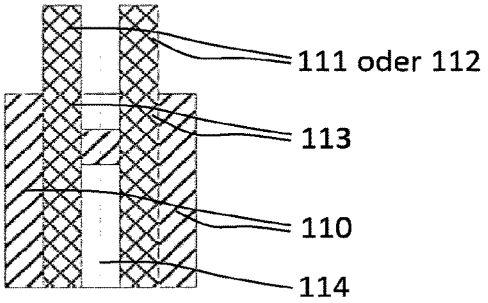
Figure 7E:
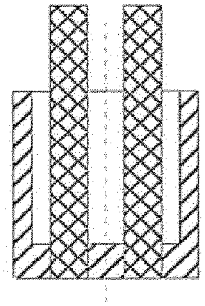
Figure 7F:
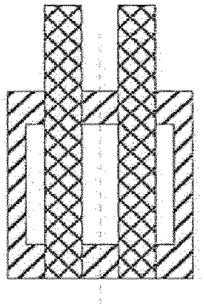
Figure 7G:
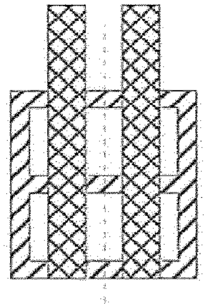
Figure 7H:
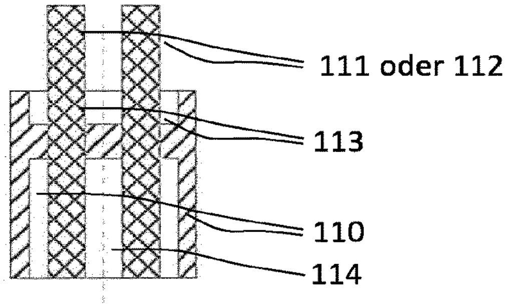
Figure 7I:
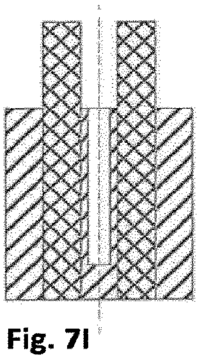
Figure 7J:
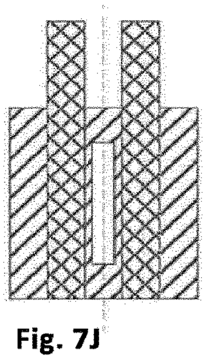
Figure 7K:
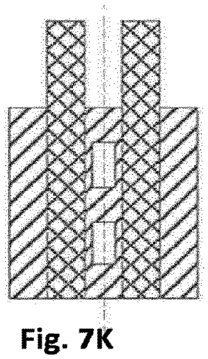
Figure 7L:
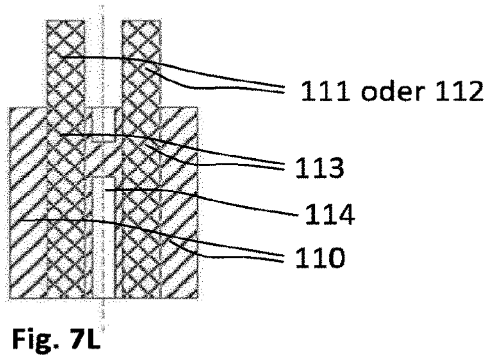
Figure 7M:
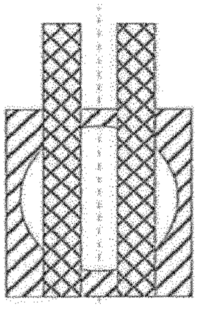
Figure 7N:
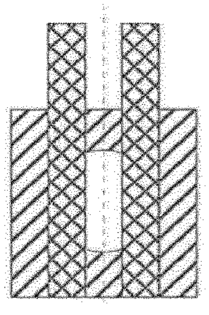
Figure 7O:
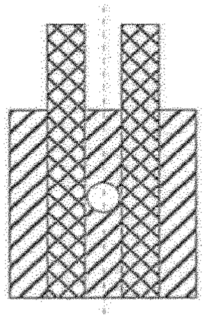
Figure 7P:
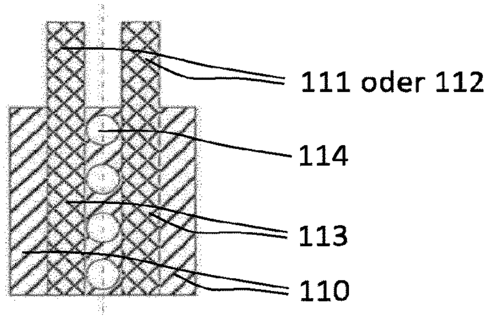

FIG. 7A to 7P are each schematic cross sections of further embodiment examples of the dielectric enclosure 110, each of which can be implemented as a variant or development of the first embodiment example and/or in combination with features of any of FIG. 6A to 61. In FIG. 6A to 61, the first transverse direction is vertical and the longitudinal direction is horizontal.

Areas with identical hatching denote like features within each figure and/or corresponding features among various figures. For better clarity, reference numerals are marked only in FIGS. 7D, 7H, 7L, and 7P.

The clearance 114 may be spherical or cylindrical, as shown for example in FIG. 7M to 7P. FIG. 7J may correspond to the first embodiment example.

The at least one clearance 114 may be one contiguous space. Alternatively, the at least one clearance 114 may comprise a plurality of clearances 114 or compartments, as shown for example in FIGS. 7C, 7D, 7G, 7H, 7K, 7L, and 7P.

Alternatively or additionally, the clearance 114 may be open toward the connection side 102 or the plugging side 101, as shown for example in FIGS. 7A, 7D, 7E, 7H, 7I, and 7L.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

Plug connector 100
Plugging side 101
Connection side 102
Dielectric enclosure, also: contact support 110
Plug contacts 111
Connection contacts 112
Conductor 113
Clearance 114
Cross-dimension of the clearance 115
Chamfers toward the clearance 116
Latch element, preferably a bulge transversely to the longitudinal direction 118
Polarity encoding of the enclosure 119A, 119B
Housing part 120
Receiving opening 122
Covering of the plug contacts 124
Latching window 126
Latching recess 128
Polarity encoding of the housing part 129A, 129B

The invention claimed is:

1. A plug connector for symmetrical signal transmission, comprising:

at least two connection contacts on a connection side of the plug connector;

at least two plug contacts on a plugging side of the plug connector on an opposite side to the connection side;

at least two conductors, each of which is configured to connect one connection contact to one of the plug contacts in an electrically conductive manner; and a dielectric enclosure of the at least two conductors, the dielectric enclosure having at least one clearance between the conductors, wherein the dielectric enclosure is resilient in a first transverse direction transverse to a longitudinal direction of the at least two conductors, with the clearance deforming and/or with the at least two conductors bending.

2. The plug connector of claim 1, wherein a recess or through-opening in the dielectric enclosure encompasses the clearance.

3. The plug connector of claim 1, wherein the clearance comprises a gas-tight cavity.

4. The plug connector of claim 1, wherein the dielectric enclosure is integral in one piece and/or comprises an injection-molded part.

5. The plug connector of claim 1, wherein the dielectric enclosure extends from the connection side to the plugging side.

6. The plug connector of claim 1, wherein the dielectric enclosure surrounds each of the at least two conductors.

7. The plug connector of claim 1, wherein the dielectric enclosure surrounds each of the at least two conductors, one being on the plugging side and one on the connection side.

8. The plug connector of claim 1, wherein a material of the dielectric enclosure has a relative permittivity of at least 1.5 or 2 and/or of at most 8.

9. The plug connector of claim 1, wherein the dielectric enclosure between the conductors in a cross-section transverse to a longitudinal direction of the conductors through the clearance has an effective relative permittivity of less than 2.

10. The plug connector of claim 9, wherein an effective relative permittivity, $$\varepsilon_r^{(eff)},$$

is determined by $$\varepsilon_r^{(eff)} = \frac{d}{\sum_j \frac{d_j}{\varepsilon_r^{(j)}}},$$

where $d=\Sigma_j d_j$ is a distance between the conductors in cross-section and $$\varepsilon_r^{(j)}$$

is a relative permittivity in the related portion of a width $d_j$ of the cross-section.

11. The plug connector of claim 1, further comprising:

a housing part having an inner surface and at least one latching recess in the inner surface, and a receiving opening that opens toward the inner surface and is configured to receive the dielectric enclosure in the longitudinal direction, wherein the dielectric enclosure has a latch element which is arranged so as to slide over the inner surface, with contraction occurring in the first transverse direction, when the dielectric enclosure is received in the housing part, and to reach into the latching recess, with widening occurring in the first transverse direction, when the enclosure is in the received state in the housing part.

12. The plug connector of claim 1, wherein the clearance widens toward an exterior of the dielectric enclosure in a second transverse direction that is transverse to the first transverse direction and transverse to the longitudinal direction.

13. The plug connector of claim 10, further comprising:

a cable connected on the connection side to the at least two connection contacts in an electrically conductive manner, or a terminal of a printed circuit board, wherein a cross-dimension of the clearance in the dielectric enclosure transverse to a longitudinal direction of the at least two conductors influences a characteristic impedance of the plug connector, the characteristic impedance being adjusted to a characteristic impedance of the cable or of the printed circuit board terminal.

14. The plug connector of claim 13, wherein the characteristic impedance of the plug connector is inversely proportional to a square root of the effective relative permittivity, $$\varepsilon_r^{(eff)}.$$

15. The plug connector of claim 1, wherein the symmetrical signal transmission comprises symmetrical differential signal transmission.

16. The plug connector of claim 3, wherein the gas-tight cavity is filled with air or a noble gas or evacuated.

17. The plug connector of claim 6, wherein the dielectric enclosure surrounds each of the at least two conductors, in each case at least at one point between the connection side and the plugging side or continuously between the connection side and the plugging side.

18. The plug connector of claim 10, wherein $$\varepsilon_r^{(j')} = \varepsilon_r^{(Air)} \text{ or } \varepsilon_r^{(j')} = 1$$

in the portion of the cross-dimension, $d_j$, of the clearance.

19. The plug connector of claim 1, wherein the dielectric enclosure is resilient in a first transverse direction transverse to the longitudinal direction of the at least two conductors, with the cross-dimension decreasing.

20. A plug connector for symmetrical signal transmission, comprising:

at least two connection contacts on a connection side of the plug connector;

at least two plug contacts on a plugging side of the plug connector on an opposite side to the connection side;

at least two conductors, each of which is configured to connect one connection contact to one of the plug contacts in an electrically conductive manner; and a dielectric enclosure of the at least two conductors, the dielectric enclosure having at least one clearance between the conductors, wherein the clearance comprises a gas-tight cavity.

* * * * *